United States Patent
Hall et al.

(10) Patent No.: US 6,767,211 B2
(45) Date of Patent: Jul. 27, 2004

(54) METHOD AND APPARATUS FOR BEHAVIORALLY REINFORCED TRAINING WITH GUIDED PRACTICE

(76) Inventors: Carolyn W. Hall, 13124 Fox Path La., West Friendship, MD (US) 21794; Charles A. Shields, 13125 Fox Path La., West Friendship, MD (US) 21794

( * ) Notice: Subject to any disclaimer, the term of this patent is extended or adjusted under 35 U.S.C. 154(b) by 274 days.

(21) Appl. No.: 09/808,597

(22) Filed: Mar. 13, 2001

(65) Prior Publication Data

US 2002/0168620 A1 Nov. 14, 2002

(51) Int. Cl.$^7$ .............................................. G09B 11/00
(52) U.S. Cl. ..................................... 434/236; 434/322
(58) Field of Search ................................ 434/322, 327, 434/350, 307 R, 365, 362, 219, 236–238; 463/42; 705/14; 600/300

(56) References Cited

U.S. PATENT DOCUMENTS

| | | | | |
|---|---|---|---|---|
| 4,593,904 A | * | 6/1986 | Graves ........................... | 463/9 |
| 5,823,781 A | * | 10/1998 | Hitchcock et al. ........... | 434/118 |
| 5,879,163 A | * | 3/1999 | Brown et al. ................. | 434/236 |
| 5,942,969 A | * | 8/1999 | Wicks ..................... | 340/286.02 |
| 6,039,688 A | * | 3/2000 | Douglas et al. .............. | 600/300 |
| 6,102,406 A | * | 8/2000 | Miles et al. .................. | 273/430 |
| 6,257,896 B1 | * | 7/2001 | Fargano ....................... | 434/322 |
| 6,338,628 B1 | * | 1/2002 | Smith .......................... | 434/236 |
| 6,435,880 B1 | * | 8/2002 | Tsumori et al. .............. | 434/323 |
| 6,438,353 B1 | * | 8/2002 | Casey-Cholakis et al. .. | 434/350 |

* cited by examiner

*Primary Examiner*—Teresa Walberg
*Assistant Examiner*—Kathleen M. Christman
(74) *Attorney, Agent, or Firm*—Robert K. Tendler

(57) ABSTRACT

A system provides training by automatically transmitting learning activities or tasks to an individual during the day. In one embodiment, this is done over the Internet by transmitting as a series of limited content mini-lessons to an individual's computer, wireless phone, or personal digital assistant so that the individual learns faster and more completely by being prompted to perform simple learning tasks throughout the workday. Each lesson or guided practice range in duration from 15 seconds to approximately 5 minutes or less, depending on content requirement. In one embodiment, mini-lessons and follow-up activities are designed to be integrated into the learner's daily experiences without requiring the learner to significantly deflect attention from his or her normal responsibilities or activities.

17 Claims, 4 Drawing Sheets

METHOD AND APPARATUS FOR BEHAVIORALLY REINFORCED TRAINING WITH GUIDED PRACTICE

FIELD OF INVENTION

This invention relates to training and more particularly to an Internet-based training method for providing interactive lessons with guided practice for improved behavioral modification and learning.

BACKGROUND OF THE INVENTION

It will be appreciated that many companies utilize training seminars in order to modify the behavior of their employees or to provide for more competency in their jobs. Training seminars are usually held at various training sites, which may or may not be within the company's buildings. Trained personnel are utilized in the training sessions in order to address such problems as the enhancement of career performance, learning and potential, empowerment and personal productivity.

However, the results of such training session are poor. Failure to retain learned content or embed it into behavior, lack of interest, or the fact that the individual must be away from his or her office and out of the workplace and work environment are all significant negative factors in the success of current training processes.

Traditional training has followed two main paths: self-paced or leader-led. In the past the need for training has been determined without a structured or consistent process by supervisors trying to fix performance issues, attitude problems, lack of skill sets and to a lesser degree cultural and soft-skill concerns. Soft skills refer to the ability to deal constructively with others. These have been referred to as Emotional IQ in recent research.

Statistics show that retention from event-style training can be less than 18% of total content presented. Further, interviews with successful business leaders have agreed that less than 10% of the learning required to do advanced jobs is learned through classroom learning experiences.

Moreover, assessment for training needs has been inadequate across all industries resulting in mass training based on the "fad of the month". The inadequacy becomes more evident when examining training at the individual level. Additionally, the desire in business to be able to develop employees in-house has proved unattainable. The result is that million of training and development dollars are wasted on generic training unaligned to corporate goals.

The advent of web-based and computer-based training has not yielded the reward that was originally promised. Expensive, and largely non-interactive, technology-supported training has not removed barriers to effective training. These include proper assessment for needs, appropriate interactivity for adequate learning, follow-up experiential learning to embed behaviors, and guided practice.

Adult learners have been shown to learn only what they have to and only when they need to. Training in advance of need does not yield results. On-the-job training has been shown to be effective only in teaching technical and functional skills and not the interpersonal skills important in today's workplace.

Thus, the main reason most people fail in their jobs is that they do not have the necessary behavioral competencies to meet the requirement of their workplace. Practice and feedback are missing from technology-based training. Further, the training cannot address non-verbal weaknesses or lack of interpersonal performance. Additionally, no live modeling level of behavior is possible and the social learning of soft skills is missing.

Moreover, there is an inherent issue of lower sense of priority of self-study, which has yet to be addressed by current training methods.

SUMMARY OF THE INVENTION

The above problems with the traditional training and indeed computer-based training are solved in the subject invention by tailoring a program of learning for each individual and by providing learning activities or tasks in the form of mini-lessons to the individual at his or her work place in courses broken down to 2–4 minutes of content delivered in mini content objects followed by practice sessions that are integrated into the workday to be practiced on the job. This content, in one embodiment, is pushed to the individual using any number of technology platforms sending the mini-content objects from a web site to a computer at the individual's workstation or to his or her personal digital assistant to a web adapted wireless phone, or to a Voice XML over POTS, to give the individual a number of activities or tasks to perform during the day which are short and which can be practiced while at the workplace.

In one embodiment, the individual responses are transmitted back to a central server for analysis so that the individual's reaction to the content pushed by the system can be evaluated and responses or updates provided.

It is to be noted that the system is not self-paced, but rather is driven at a pace determined to be that which is not disruptive to the individual during his or her workday but forces the individual to interact and learn. In one embodiment, the subject system provides break-time for learner's vacations, heavy workload periods, travel periods or other possible scheduling challenges.

Thus, whether the individual is at his desk, on a sales call, or a meeting the individual is prompted to learn and practice the small bits of information that are passed to him or her. In some instances, the individual may be required to respond to the information pushed to him or her, again forcing the individual to learn by acknowledging receipt of the pushed information and to respond to it in the manner that can be measured.

The result is that the content is learned and reinforced over the course of the day without taking the learner out of their work environment. Note that assurance of behavioral impact requires training reinforced over time to provide optimal adult learning reinforcement.

In addition to the 2–4 minute content dissemination to the individual, it has been found that brief, 10–15 second guided practices during the day are beneficial to the learning process in terms of retention and behavior modification.

Thus the subject system is active and impacts behavior due to the monitoring of responses to the mini-lessons during the day.

Also removed is the requirement to spent any time away from the job for training, with the subject system directly linking the training to the work environment. Moreover, because the information can be pushed to a pre-determined individual, the training is individualized as opposed to that associated with congregating employees at a training seminar. When the individual gives his or her response, the response can be evaluated and the experiential learning can be targeted more precisely, if needed. Note that the learning is experimental in the sense that it is a "learn-as-you go" or apprenticeship regime.

Reinforcement is accomplished by sending guided practice messages every few hours via a variety of technologies including a web-enabled wireless phone, a pager or personal digital assistant and various emerging technologies. When the individual is at his or her desk, the desktop computer can also be utilized for this purpose.

The subject system thus utilizes web-based training and in one embodiment provides a chat room and voice-over-phone web interfaces along with personal digital assistants, cellphones or pagers, which can be utilized to display the pushed information and to accept responses, if required.

Thus, the subject training is "push" or active training rather than passive training, with the system sending out the information and reminding the individual that he must respond, as opposed to having to ask for the training. Because of the two-way facility, individual assessment of competency-based needs is accomplished through the collection of data at a central server.

The subject training method is unique in that it can address specific competencies. Engaged listening, constructive conflict resolution, problem solving, critical thinking, flexible learning, effective decision-making, consistent effectiveness are a few of a virtual plethora of behavioral skills that are addressed in this method. Moreover, the method can identify individual developmental needs through assessment, and a curriculum can be created based on the results of the assessment. For companies addressing global issues, all subject learners can be placed in themed tiers to achieve specific competency-related outcomes. For purposes of discussion, these themed curriculum paths are categorized as: Enhancing Personal Performance, Increasing Individual Potential, Empowerment, Improving Personal Productivity, and Managing Continuous Change.

This method is viewed as the basic support structure for multiple types of learning all utilizing the mini content object to deliver small pieces of training content and follow-up practice. Some areas of interest for individual development supported by this method include: career development, individual competency development, sports/fitness, health/recreation, women's professional development, travel and leisure, community and shopping and resources.

More specifically, the subject system provides training by automatically transmitting learning activities or tasks to an individual during the day. In one embodiment, this is done over the Internet by transmitting as a series of limited content mini-lessons to an individual's computer, wireless phone, or personal digital assistant so that the individual learns faster and more completely by being prompted to perform simple learning tasks throughout the workday. Each learning activity or task is limited in duration to approximately 5 minutes or less, depending on content requirement. In one embodiment, the mini-lessons and follow-up activities are designed to be integrated into the learner's daily experiences without requiring the learner to significantly deflect attention from his or her normal responsibilities or activities.

To begin the program, each learner will generate an individualized development plan via a web-based assessment or by self-selecting critical competency theme areas contained within the system. The personalized plan determines the curriculum and drives the transmission of learning activities or tasks over the Internet to a computer or, alternatively, to a wireless phone, pager, personal digital assistant or a voice-based Internet application available over the plain old telephone system or POTS, currently Voice XML in which voice messages provide the mini-lesson. Each of these technology assists provide a platform on which the course work is delivered to learners who are at remote sites or away from their computers during the day.

The key to impacting learning at the behavioral level is to maintain consistent contact throughout the day to deliver the mini-content lesson followed by experiential guided practices which are sent periodically, approximately 3 times per day, and are brief, i.e. generally limited to 10 seconds to under 5 minutes of lesson activity and follow-up guided practice. The result is personalized training targeted at embedding the mini-lessons into the daily behavior of the learner by sending experientially based learning lessons and guided practices every few hours.

The system utilizes a model of just-in-time experiential learning, incorporating practice on-the-job and continuous support from various technology platforms, allowing the lesson information to be absorbed while at work. This eliminates the requirement to spend time away from the job for training.

To ensure behavioral impact, each mini-lesson is reinforced daily. Responses to the learning tasks result in assessments designed to identify that the learner has successfully acquired the content knowledge before moving on to a new course. Unsuccessful performance on an assessment will automatically return the learner to a secondary path for additional experience based practice. Upon successful completion of each assessment, the learner will be introduced to a new section of their curriculum. Reinforcement of completed learning will be occasionally spiraled or reintroduced into the training to optimize the impact on embedded behavior and therefore the return on learning investment.

As will be seen, a system is provided to deliver individual development to any location by automatically transmitting learning lessons, guided practice or information to the individual a number of times during the day, with each learning activity or practice being limited in duration and packaged as a mini content object. In one embodiment, the Internet is utilized along with push technologies, which, upon competency assessment and development of an individualized curriculum, provides course work in terms of the transmission of learning activities or tasks over the Internet to a computer, wireless phone, pager, personal digital assistant or voice-based web over POTS, in which the course work is delivered to the remote computer throughout the day with guided practice sent periodically and generally limited to 10–30 seconds of guided practice messages. The result is personalized training targeted precisely to alter the behavior, with guided practice messages sent every few hours. The system utilizes a model of just-in-time experience, practice on-the-job and continuous platforms, such that bits of information can be integrated into a workday. This eliminates the requirement to spend time away from the job for training and may directly link the training to the work environment. To ensure behavioral impact, the training is spiraled into the future lessons to ensure that all learning is reinforced multiple times to ensure optimal retention, with the training courses linked, in one embodiment, to a personal assessment designed to identify the biggest gaps between what is important to the success of the individual's job and their current skill level.

In summary, a system provides training by automatically transmitting learning activities or tasks to an individual during the day. In one embodiment, this is done over the Internet by transmitting as a series of limited content mini-lessons to an individual's computer, wireless phone, or personal digital assistant so that the individual learns faster and more completely by being prompted to perform simple learning tasks throughout the workday. Each lesson or guided practice range in duration from 15 seconds to approximately 5 minutes or less, depending on content requirement. In one embodiment, mini-lessons and follow-up activities are designed to be integrated into the learner's daily experiences without requiring the learner to significantly deflect attention from his or her normal responsibilities or activities.

BRIEF DESCRIPTION OF THE DRAWINGS

These and other features of the subject invention will be better understood in connection with the Drawings and in conjunction with Detailed Description of which.

DETAILED DESCRIPTION

Figure 1:
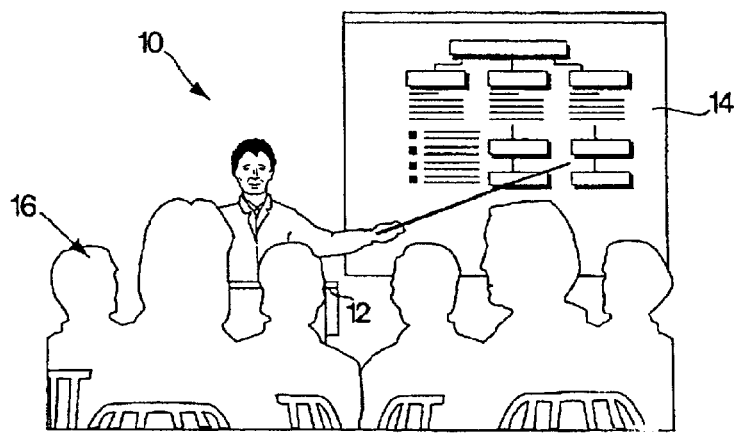
FIG. 1 is a diagrammatic representation of the prior art training session method in which a trainer lectures a group of individuals.

Referring now to FIG. 1, in a typical training session a trainer 10 lectures from a podium 12 utilizing a graphics display board or screen 14. The content delivered by the trainer or lecturer is intended to affect the behavior of individuals 16 in an auditorium or a room.

It has been established that while this type of training session is prevalent throughout the industry, the retention levels of the individuals are in general less than 18%. What will be appreciated is that the individuals must go to a given area such as a training or off-site conference room, which impacts their workday and results in decreased productivity. Moreover, once in the training session, it is very difficult for the trainer to individually target the individual's problem with the result being that the trainer gives generalized advice that may or may not be applicable to the particular individual.

Such inefficiencies are well known, with the resulting retention not usually justifying the cost of the training.

In contradistinction to the above training method, in the subject system time limited tasks or activities are presented to the individual during his workday, which tasks are targeted to training the individual in a variety of different areas of deficiency.

Figure 2:
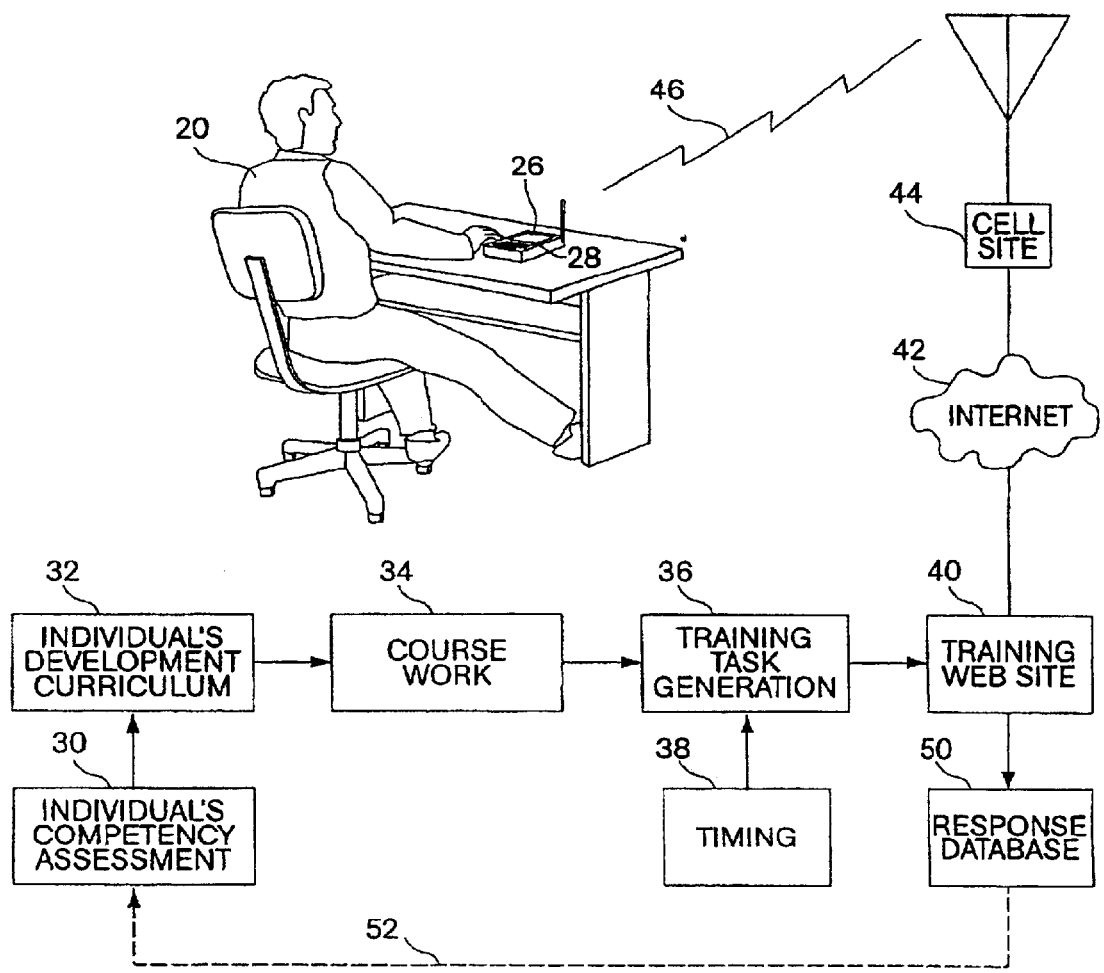
FIG. 2 is a diagrammatic illustration of the subject invention in which training tasks are transmitted on a periodic basis to an individual in his work environment through the utilization of a personal digital assistant on his or her desk.

As illustrated in FIG. 2, in order to receive training an individual 20 is seated at his or her desk 22 which is provided in the illustrative embodiment with a personal digital assistant 24 that has a display screen 26 and a keypad entry 28 to which the individual has access during his working day.

In order to provide an efficient training method, the individual's competency is assessed as illustrated at 30 and a curriculum is developed for each individual as illustrated at 32. From the curriculum course work is defined at 34, which involves tasks that can be presented to the individual on a timely and periodic basis without intrusively interfering with his or her workday. The course work is embodied in a training task generation unit 36, the output of which is timed at 38 to be outputted to a training site 40, which is connected to Internet 42. Coupled to the Internet is a cell site 44, which transmits over an RF link 44 the particular training task to personal digital assistant 24 where it is displayed on display 26.

In this manner individual 20 is altered to perform the work defined by the training task displayed, and optionally to enter a response at keypad 26 to indicate either that the individual has received the task or to record a response to a particular task which is then transmitted back through the Internet and is retained in a response database 50. Analysis of the responses in database 50 can be used as illustrated by dotted line 52, resulting in again assessing the competency of the individual so that realtime adjustment of the course work can be made to further improve the learning process.

What will be appreciated that the individual need not leave his or her workstation in order to be able to be prompted to do a task, which assists in his or her learning.

It has been found that depending on the individual and the task provided, the individual has in excess of an 80% retention level. In order to maintain this retention level the training can be made to repeat for twenty-one days.

Figure 3:
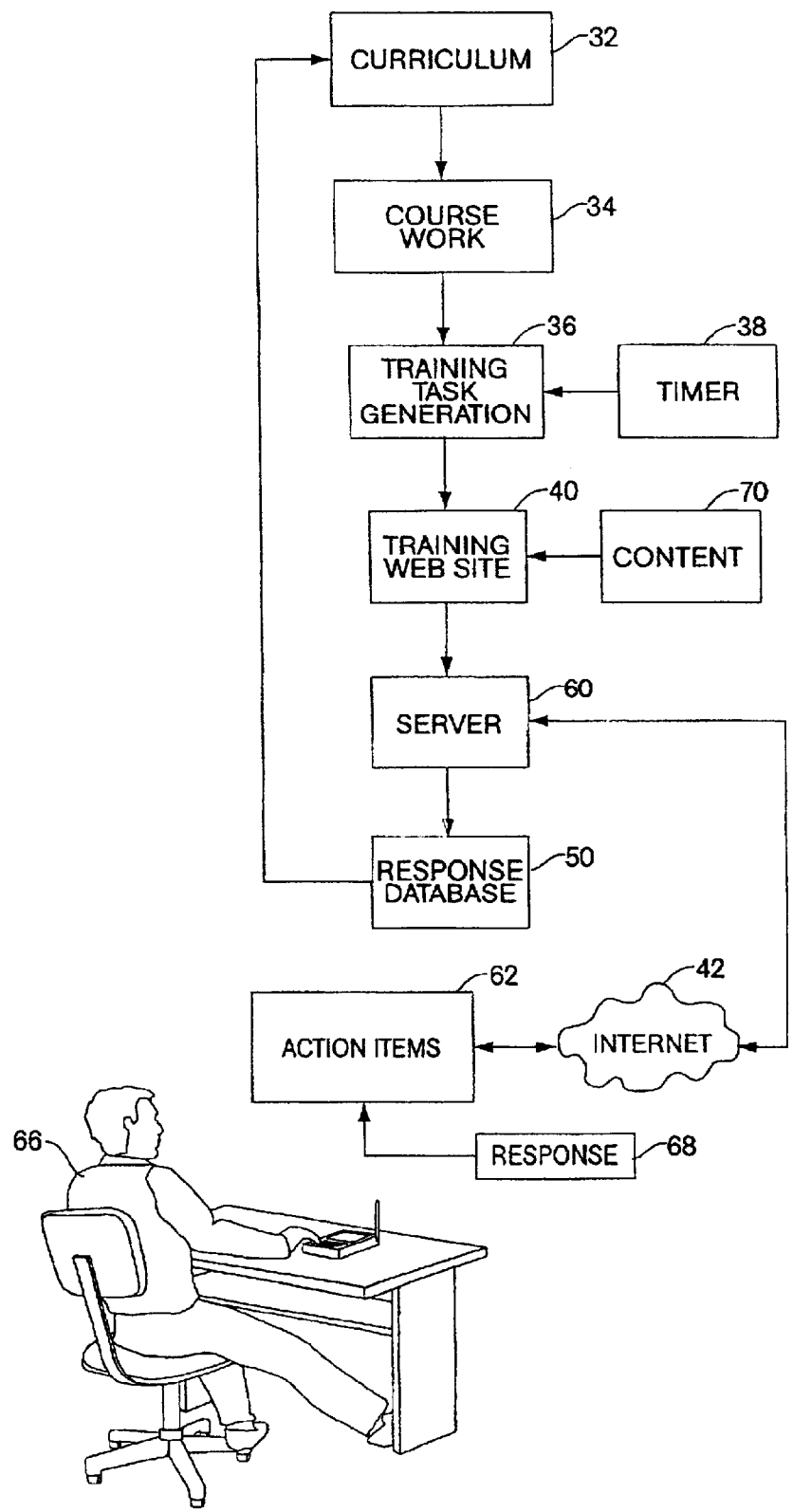
FIG. 3 is a block diagram of the subject system illustrating the utilization of a curriculum which defines course work that in turn defines training tasks, which are placed on a web site and accessed by the individual through the utilization of an interactive portable computing device coupled to the Internet.

Referring to FIG. 3 in which like items carry like reference characters, the training web site is on a server 60 which is coupled to an interactive portable computing device 62, which may be a pager, a wireless phone, a personal digital assistant or a voice/data over POTS where POTS stand for Plain Old Telephone System. It will be appreciated that interactive portable computing device 62 is that which displays training tasks 64 as action items which are those items which contain tasks that the individual is to do. A response is entered by individual 66 over response unit 68.

In addition to simply providing the individual with training activities in terms of action items, content as here illustrated at 70 may also be delivered to the individual. This content may be utilized to supplement the task to be performed and can be used to make the training more interesting. Content 70 is coupled to the training web site and thence to the server and the Internet to the display at the individual.

Thus what is provided is a method for making the learning process as easy as possible and as effective as possible while at the same time minimizing the costs, in both time and money, involved in traditional training. More importantly, the training is individualized such that the retention rate for each individual is markedly increased over that described above.

Figure 4:
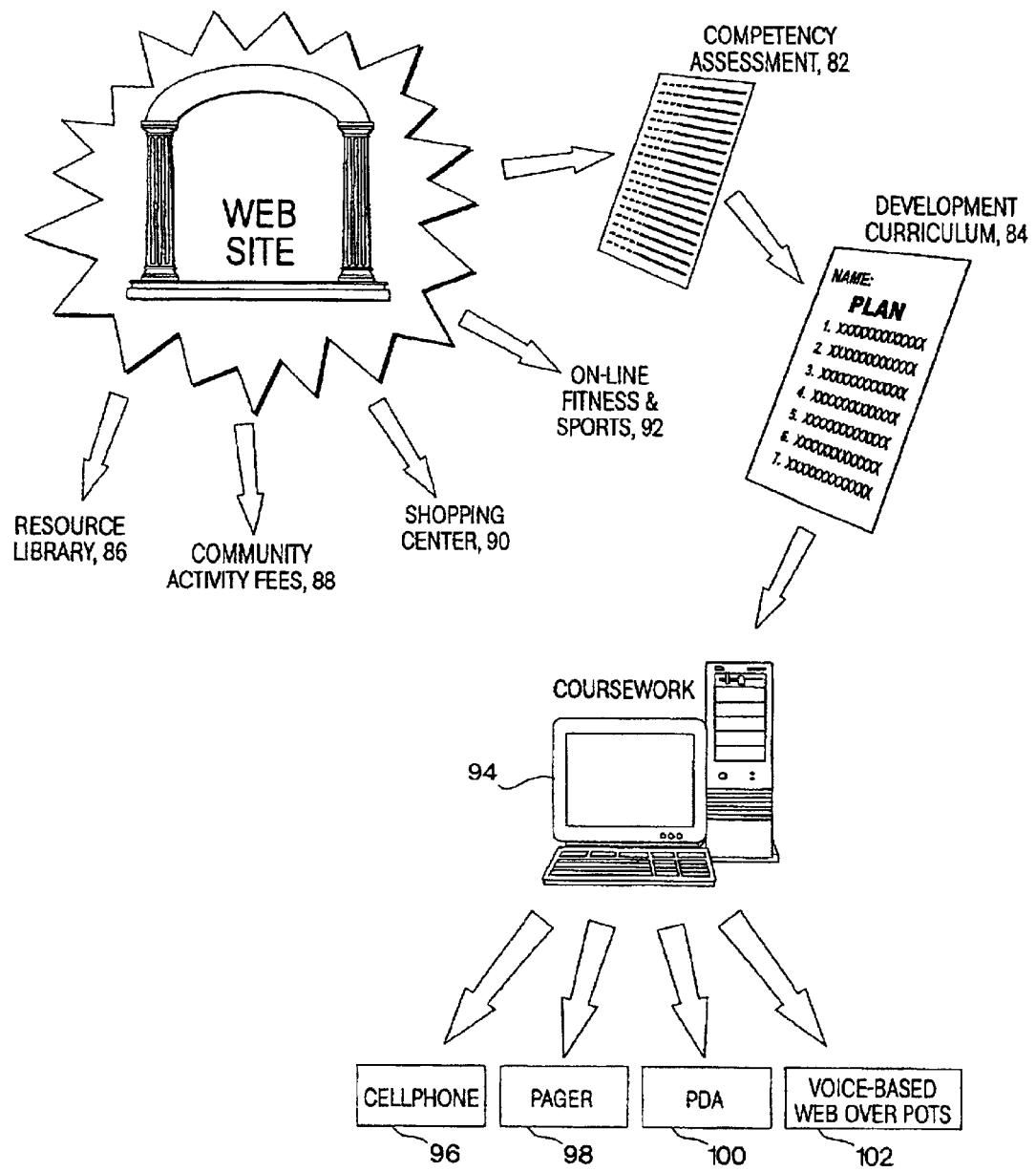
FIG. 4 is a diagrammatic illustration of one embodiment of the subject invention in which the web site used to develop competency assessment and curriculum which results in course work that is in turn disseminated to the individuals requiring training with the website also being a repository for content including a resource library, community activities, a shopping center and on-line fitness and sports information and providing opportunities for other individual learning: and, FIG. 5 is a flow chart diagram showing the use of mini content objects in a push/pull scenario.

More specifically, and referring now to FIG. 4, a web site 80 in addition to involving a competency assessment 82 and a curriculum 84 which is developed as a result of the competency assessment, also provides content in term of, for instance, a research library 86, community activities 88, a shopping center 90 and an on-line fitness and sports content 92. The subject system can thus be used not only for improvement in several of the individual skills; it can also be used to push relevant information for training or can in fact be entertaining as well. The coursework generated by development curriculum 84 is compiled at 94 and disseminated as training tasks to the training devices associated with each individual such as a wireless phone 96, a pager 98, a personal digital assistant 100 or the aforementioned voice/data web over-POTS 102.

Figure 5:
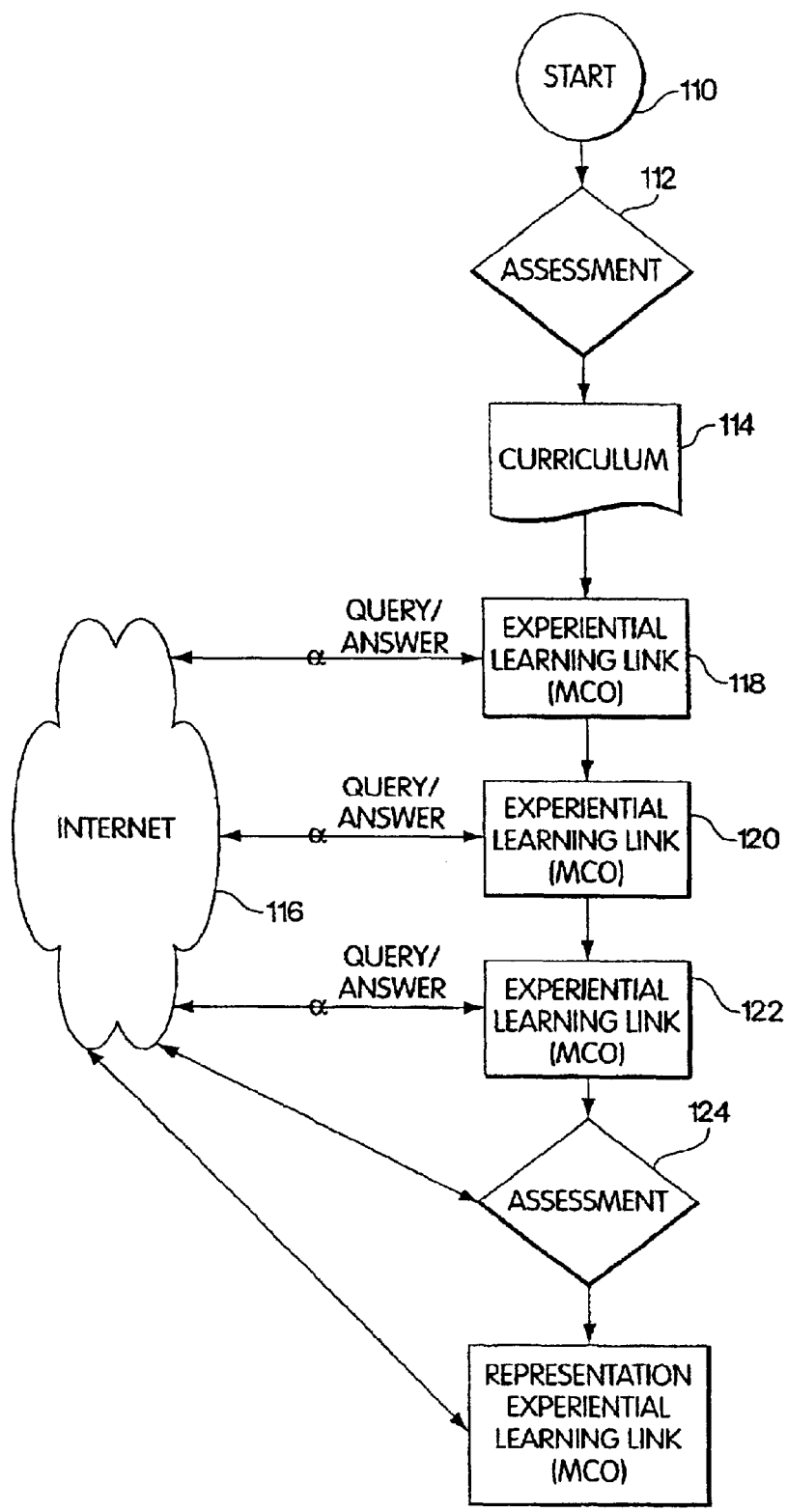

Referring to FIG. 5, the learner starts 110 with an assessment 112 which generates a targeted curriculum 114 consisting of targeted experiential learning consisting of mini-content objects, MCOs, 118–122 whose actual number will be tailored to the targeted learning. Each MCO can be sent via multiple technology platforms enabling the learner to query or answer interactively when necessary. Periodic assessments 124 will determine the success of the learner and either move the learner to new content areas or send them back to remediate areas of non-mastery.

In order to illustrate the curriculums, which can result in coursework, the following tables are presented so as to be able to target employee development in various areas.

TABLE I

Themed Curriculum 1 - Enhancing Personal Performance

Competency

1. Constructive Conflict Resolution
2. Engaged Listening
3. Customer Service Orientation
4. Effective Decision Making
5. Focus on Results
6. Dealing with Change
7. Flexible Learning
8. Problem Solving
9. Creating Effective Teamwork
10. Managing Work & Time Effectively
11. Leading and Motivating Others
12. Critical Thinking
13. Balanced Management
14. Consistent Effectiveness
15. Creativity and Curiosity
16. Perseverance
17. Business Knowledge
18. Working Remotely
19. Reflective Thinking

TABLE II

Themed Curriculum 2 - Increasing Individual Potential

Competency

1. Creating Effective Teamwork
2. Constructive Conflict Resolution
3. Dealing with Change
4. Problem Solving
5. Leading and Motivating Others
6. Engaged Listening
7. Reflective Thinking
8. Evaluating Others
9. Composure and Patience
10. Flexible Learning
11. Professional Presence
12. Consistent Effectiveness
13. Critical Thinking
14. Concept Development
15. Shifting Paradigms
16. Strategic Thinking
17. Creativity and Curiosity
18. Business Knowledge TABLE II-continued Themed Curriculum 2 - Increasing Individual Potential Competency 19. Working Remotely
20. Perseverance

TABLE III

Themed Curriculum 3 - Empowerment

Competency

1. Approachability and Compassion
2. Leading and Motivating Others
3. Leveraging Diverse Talent
4. Delegating Equitably
5. Creating Effective Teamwork
6. Dealing with Change
7. Critical Thinking
8. Engaged Listening
9. Balanced Management
10. Evaluating Others
11. Constructive Conflict Resolution
12. Shifting Paradigms
13. Creativity and Curiosity
14. Composure and Patience
15. Working Remotely
16. Rapport and Diplomacy
17. Reflective Thinking

TABLE IV

Themed Curriculum 4 - Improving Personal Productivity

Competency

1. Focus on Results
2. Business Knowledge
3. Effective Decision Making
4. Delegating Equitably
5. Flexible Learner
6. Perseverance
7. Problem Solving
8. Managing Work & Time Effectively
9. Dealing with Change
10. Engaged Listening
11. Creativity and Curiosity
12. Balanced Management
13. Consistent Effectiveness
14. Critical Thinking
15. Working Remotely
16. Reflective Thinking

TABLE V

Themed Curriculum 5 - Managing Continuous Change

Competency

1. Dealing with Change
2. Business Knowledge
3. Customer Service Orientation
4. Leveraging Diverse Talent
5. Shifting Paradigms
6. Flexible Learning
7. Problem Solving
8. Strategic Thinking
9. Composure and Patience
10. Constructive Conflict Resolution
11. Critical Thinking
12. Engaged Listening TABLE V-continued Themed Curriculum 5 - Managing Continuous Change Competency 13. Leading and Motivating Others
14. Creativity and Curiosity
15. Critical Thinking
16. Consistent Effectiveness
17. Concept Development
18. Working Remotely
19. Effective Decision Making
20. Focus on Results
21. Reflective Thinking For instance as can be seen from Table I, Enhancing Personal Performance has associated with it no less than nineteen different competency areas, whereas Increasing Individual Potential, Table II, has associated with it twenty competencies. Table III shows an Empowerment Program with sixteen competencies, with Table IV and V having respectively seventeen competencies for Improving Personal Productivity and twenty-one competencies for Managing Continuous Change.

Taking Empowerment for example, if an employee has a problem with rapport or equitable delegation of work, a course curriculum can be generated which will result in specific tasks to improve the rapport and the equitable delegation of duties for the individual. For Improving Personal Productivity, for instance, managing work and time effectively can be enhanced, critical thinking can be increased, all through the utilization of course work designed for such improvement.

The same is true for improving a person's ability to cope with change, which is an inevitable constant in the workplace. Such skills as flexible learning and shifting paradigms can be structured in the coursework designed through the task-generated, experiential learning model to assist the individual in coping with changes in the work place.

What will be seen is that an individual's competencies can be improved through the utilization of training which is presented to the individual not in a mass meeting but rather tailored to his or her needs, at times during the day which are convenient for the individual, woven into their daily experiences, with guided experiential practice and without having the individual move from his or her workplace.

It is thus possible, for instance, with salespeople who are on the road, to be able to prompt that learner to perform a training task at convenient times during the day such that the individual is not tied to a particular room or a particular device for receiving his or her training.

Referring now to FIG. 5, what is described is a push/pull scenario in which queries and answers are incorporated into sequential experiential learning links so that the mini-courses can be adapted on the fly to support the actual learning that is taking place. Here, at the start 110 of the process and assessment of the individual's needs 112 is made and a curriculum 114 are developed.

Thereafter, a mini-course object is pushed to the individual via the Internet 116 to a multi-format presentation device such as a computer, cell phone, pager, PDA or voice XML over POTS. The individual can use the presentation device to record his or her response to the course object task presented in a pull operation, with the process being referred to herein as an experiential learning link, here illustrated at 118.

This mini-content object push/pull process is repeated as illustrated at links 120 and 122, with an assessment being done at 124. Thereafter, a representation experiential learning link represents the continuation of mini-content objects packaged as experiential learning links interspersed with assessment to illustrate a continuing learning experience.

While the subject system has been described above in terms of providing training to increase the competency of an employee, there are other applications for which providing mini-courses and guided experiential practice during the day are useful.

One can envision in the sports area teaching golf at one's desk with short exercises to be performed by the individual. It may also be useful to provide training assist devices such as a foreshortened golf club to permit practice in an office, with the feedback being provided, for instance, by a marked rug on the floor or even a body garment to record the individual's movements.

Such a course is outlined as follows:

Golf, taught using mini-content objects containing experiential learning links would consist of simple 2 minute sequentially ordered steps with guided practice during the day to produce mastery of the basic golf swing, use of different clubs, timing, strategy, course management, etiquette, and ultimately the total requisite knowledge required to play golf. By utilizing small pieces of content knowledge and guided practice, the learner reduces the introduction of bad habits through misinterpretation of information and poor practice habits.

A second application revolves around healthcare issues. Taking of medications, stationary exercises, diet hints and the like may be practiced during the day when prompted by a mini-course. Such a health consulting program could be as follows:

Learners can identify behaviorally linked health goals they want to achieve. In one instance, the learner may want to learn to reduce stress and increase activity during the day. In scheduled "pushes" to the learner at his or her desk or remote location, the learner might spend 30 seconds to 4 minutes on stress reducing visualizations and meditations, as well as incorporating targeted exercises or activities designed to increase blood flow, improve muscle flexibility, reduce stress or to meet whatever goals have been set by the learner.

The subject system may also be utilized for professional women's support to develop women's confidence in responding to situations, which they encounter during the day and about which they are not familiar. For instance, women who are not familiar with tipping or rules of business etiquette, such as shaking hands or standing can learn the concepts and practice them during the day with prompts from the subject system. Such a regime could consist of activities and practice involving:

A woman professional is meeting clients in an unfamiliar city. The learner could receive targeted experiential lessons and guided practice as well as having access via the "pull" feature of the MCO to make queries regarding tipping etiquette, hotel choices and accommodations, restaurant reservations, street directions and travel information, to name a few of the possible areas of support.

What will be seen is that any time of day retention of coursework can be increased with practice during the day in which mini-courses are presented to the user and are made sufficiently short as to be non-obtrusive. Also, responses of the individual can be measured on a bi-directional basis and the results used to alter the coursework.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. An adaptive method for teaching by issuing remediative guided practice activities based on a previously performed guided practice activity to achieve performance-based behavioral modification in a two-way communication process, comprising the steps of:

provided at an Internet site a course of scenario-based instruction having a mini-content object a series of non-knowledge based guided practice activities to be performed by an individual, each guided practice activity involving no right or wrong answer but rather behavioral tasks to be performed, each guided practice activity including information on how to modify performance;

automatically transmitting the mini-content object to the individual;

automatically transmitting, after the mini-content object the series of guided practice activities to the individual at known times, thus to provide the individual with an active learning experience through the guided practice activities;

assessing the individuals behavioral performance by pushing content to the individual to evaluate the individual's reaction to the content, thus to permit providing updated guided practice activities;

transmitting back to the Internet site the individual's reaction to the content; and, adaptively providing a remediative guided practice activity back to the individual, the adaptation based on the individual's reaction to the pushed content.

2. The method of claim 1, wherein the guided practice activities are transmitted to the individual at times preselected by the individual such that the guided practice activities are not disruptive.

3. The method of claim 1, and further including the steps of providing acknowledgement of receipt of a guided practice activity and transmitting the acknowledgement back over the Internet to the Internet site.

4. The method of claim 1, and further including providing the individual with additional guided practices from the Internet site.

5. The method of claim 1, wherein the individual guided practices activities from the Internet site are time limited so as not to interfere with the normal tasks of the individual.

6. The method of claim 1, and further including providing a device to which the guided practice activity is transmitted.

7. The method of claim 1, wherein the device is selected from the group of internet-enabled devices consisting of computers, mobile phones, pagers, personal digital assistants and voice over IP audio producing terminals.

8. The method of claim 1, wherein the automatic transmission is at a pace so as not to disrupt the individual during his workday.

9. The method of claim 1, wherein the guided practice activity includes experiential learning in which the individual is prompted to respond with some action.

10. The method of claim 1, wherein the guided practice activity is designed to improve competency in the workplace.

11. The method of claim 1, wherein the guided practice activity is designed to teach an athletic activity.

12. The method of claim 1, wherein the guided practice activity is golf.

13. The method of claim 1, wherein the guided practice activity is designed to improve a woman's reaction to a specific workplace encounter.

14. The method of claim 1, wherein the guided practice activity is designed to improve the response of the individual to health related issues.

15. The method of claim 14, wherein the health related issues include controlling the weight of the individual.

16. The method of claim 14, wherein the health related issues include addiction.

17. The method of claim 14, wherein the health related issues include the taking of medication.

* * * * *